United States Patent
Otsuji et al.

[11] Patent Number: 5,987,330
[45] Date of Patent: Nov. 16, 1999

[54] CORDLESS TELEPHONE SET

[75] Inventors: Katsuhiko Otsuji; Hiroyuki Ishida; Hideo Hikiuma; Kunihiro Takahashi; Yuzo Ishida; Takahiro Kudo; Masayasu Fujino, all of Chiba-ken, Japan

[73] Assignee: Uniden Corporation, Chiba-ken, Japan

[21] Appl. No.: 08/560,681

[22] Filed: Nov. 20, 1995

[30] Foreign Application Priority Data

Aug. 31, 1995 [JP] Japan ................................. 7-223011

[51] Int. Cl.[6] ....................................................... H04Q 7/20
[52] U.S. Cl. ........................ 455/462; 455/414; 455/566
[58] Field of Search ................................. 379/61, 58, 210, 379/211, 212, 354; 455/89, 566, 411, 550, 462; 395/114

[56] References Cited

U.S. PATENT DOCUMENTS

| | | | |
|---|---|---|---|
| 5,285,493 | 2/1994 | Wagai et al. ............................. | 379/58 |
| 5,420,965 | 5/1995 | Barker, III ............................... | 395/114 |
| 5,434,905 | 7/1995 | Maeda et al. ............................ | 379/61 |
| 5,452,347 | 9/1995 | Iglehart et al. ......................... | 379/211 |
| 5,467,383 | 11/1995 | Urasaka et al. ......................... | 379/61 |
| 5,617,468 | 4/1997 | Nojima et al. .......................... | 455/421 |

*Primary Examiner*—Dwayne D. Bost
*Assistant Examiner*—Myron K. Wyche
*Attorney, Agent, or Firm*—Fish & Richardson P.C.

[57] ABSTRACT

A cordless telephone set having various functions, such as transplantation, secrecy, repeated display and compressed display function is disclosed. A control circuit of a main unit and a control circuit of a subunit of the cordless telephone set are preprogrammed to realize a transplantation function for transplanting functions of the digital telephone set to the cordless telephone set, a secrecy function for preventing the digital telephone set from eavesdropping on communication conducted through the cordless telephone set, a repeated display function for repeatedly displaying a display message received from digital switching equipment when the subunit Y issues no answer to a call, and a compressed display function for displaying, in a compressed manner, a display message received from the digital switching equipment.

6 Claims, 6 Drawing Sheets

CORDLESS TELEPHONE SET

BACKGROUND OF THE INVENTION

1. Field of the Invention

The present invention relates to a multi-function and easy-to-use cordless telephone set.

2. Description of the Prior Arts

The applicant of the present invention has proposed in Japanese Patent Application No. HEI 6-214612 a cordless telephone set which can be connected with a variety of digital switching equipment of different protocols. The proposal was made to improve the current situation where cordless telephone sets are not commonly used in business offices because the protocols employed by digital PBXs which are used widely now differ from manufacturer to manufacturer.

FIG. 1 is a block diagram indicating constitutions of a main unit X of a cordless telephone set CT as proposed in the above patent application and a subunit Y coupled by wireless with the main unit. The main unit X of the cordless telephone set CT transmits control data and voice data on a time division basis or through a duplex bidirectional transmission system between a digital PBX through a PBX line. The constitution and operations of the main unit X will be explained hereafter for every transmitting direction with reference to FIG. 1.

When data is transmitted to the cordless telephone set CT from the digital PBX, a data transmitting/receiving circuit 2 of the main unit X receives audio data and control data specified by the protocol of the digital PBX, those data being transmitted from the digital PBX through the PBX line, and separately extracts the audio data and control data under the control of a timing signal to respectively send the control data to a protocol conversion circuit 4 and the audio data to a transmitter 10. Since the PBX line employs a system in which two wires are commonly used for transmission and reception of data or a system in which two sets of two wires are provided for transmission and reception, respectively, depending on the protocol of the digital PBX, the data receiving/transmitting circuit 2 must be structured in such a manner as to correspond to the number of interface lines of the PBX line.

The protocol conversion circuit 4 is used for conversion between control data specified by the protocol of the digital PBX connected and inherent control data (hereinafter referred to as "inherent control data") of the cordless telephone set CT. For performing such conversion, a ROM 6 which stores a look-up table indicating the correspondence between the control data specified by the protocol of the digital PBX and the inherent control data is built in the protocol conversion circuit 4. Therefore, the protocol conversion circuit 4 and ROM 6 corresponding to the protocol must be used if the protocol of the digital PBX to which the cordless telephone set CT is to be connected is different from the protocol of the PBX currently connected. A control circuit 8 has a control function which is required for an ordinary cordless telephone set. That is, the control circuit 8 receives inherent control data from the protocol conversion circuit 4, determines the content of the control, activates a transmitter 10 depending on the received inherent control data, and transmits from the transmitter 10 the control data and audio data corresponding to the inherent control data to the subunit Y of the cordless telephone set CT through a transmission/reception switching circuit and an antenna 12. The control circuit 8, transmitter 10, antenna 12 and transmission/reception switching circuit and receiver 14 are common to the cordless telephone set of the prior art.

For the purpose of connecting the PBX line to a digital telephone set TL, a data distribution/combination circuit 40 is provided in the side of the input to the data transmission/reception circuit 2 to distribute control data and audio data specified by the protocol of the digital PBX from the PBX line to the main unit X and digital telephone set TL and to transmit control data and audio data transmitted from the main unit X or digital telephone set TL to the PBX line. Between the PBX line and the data distribution/combination circuit 40, a first relay 42 is provided to switchingly connect the PBX line to the main unit X or the digital telephone set TL. If the PBX line employs the system where two wires are used in common for transmission and reception, a pair of movable contacts 42-1 of the first relay 42 are connected to the PBX line, while a first pair of stationary contacts 42-21 of the relay 42 are connected to the data distribution/combination circuit 40.

A second pair of stationary contacts 42-22 of the relay 42 and the data distribution/combination circuit 40 are connected to the digital telephone set TL through the second relay 44. Specifically, a pair of movable contacts 44-1 of the second relay 44 are connected to the digital telephone set TL, while a first pair of stationary contacts 44-21 of the second relay 44 are connected to the data distribution/combination circuit 40 and a second pair of stationary contacts 44-22 of the second relay 44 are connected to the second pair of stationary contacts 42-22 of the first relay 42, respectively.

A voltage monitoring circuit 46 is also provided in the main unit X to monitor whether a regular voltage is supplied from a power source (not shown) or not. When the regular voltage is supplied, the monitoring circuit 46 gives a signal of logical "1" to one input of an AND circuit 48. Since the protocol conversion circuit 4 usually gives a signal of logical "1" to the other input of the AND circuit 48, as shown in the figure, the AND circuit 48 applies the signal of logical "1" to the first relay 42 and the second relay 44, whereby, in the first relay 42, the movable contacts 42-1 are connected to the first pair of the stationary contacts 42-21, while, in the second relay 44, the movable contacts 44-1 are connected to the first pair of the stationary contact 44-21. However, when the voltage supplied to the main unit X becomes lower than the regular voltage, the voltage monitoring circuit 46 gives a signal of logical "0" to the AND circuit 48 to set the output of the AND circuit 48 to be in the state of logical "0", whereby the movable contacts 42-1 of the first relay 42 and the movable contacts 44-1 of the second relay 44 are respectively connected to the second pairs of the stationary contacts 42-22, 44-22, and the PBX line is forced to be connected to the digital telephone set TL.

The control circuit 8 is provided with two switches SW-1, SW-2. The switch SW-1 is turned ON to transfer communication to the digital telephone set TL when a user is talking over the cordless telephone set CT. When the switch SW-1 is closed, the control circuit 8 determines that a command to transfer communication to the digital telephone set TL from the cordless telephone set CT is issued and sends corresponding control data to the conversion circuit 4. Upon reception of this control data, the conversion circuit 4 transmits a signal of logical "0" to the AND circuit 48 to change the output of the AND circuit 48 to a logical "0" state, whereby the movable contacts 42-1 of the first relay 42 and the movable contacts 44-1 of the second relay 44 are respectively connected to the second pairs of the stationary contacts 42-22, 44-22. As a result, the communication being performed with the cordless telephone set CT is transferred to the digital telephone set TL. The switch SW-2 is turned ON in order to transfer communication with the digital telephone set TL to the cordless telephone set CT. When the switch SW-2 is closed, the control circuit 8 determines that a command to transfer communication with the digital telephone set TL to the cordless telephone set TL is issued thereby enabling communication with the subunit Y. In this case, a signal sent to the AND circuit 48 from the conversion circuit 4 is kept in a logical "1" state and none of the contacts of the first and second relays 42, 44 are switched.

When the switches SW-1 and SW-2 are operated to transfer communication to the digital telephone set TL from the cordless telephone set CT or to the cordless telephone set CT from the digital telephone set TL, control data required for transfer of communication is transmitted between the main unit X, digital telephone set TL and subunit Y. For instance, when the switch SW-1 is closed to issue a command to transfer communication to the digital telephone set TL from the cordless telephone set CT, the main unit X transmits, to the digital telephone set TL, control data which operates the digital telephone set TL in such a manner that a call is received by the digital telephone set TL. When the switch SW-2 is closed, the control circuit 8 transmits control data for setting the digital telephone set TL to be in a suspended condition.

Such a modification as follows is possible. The movable contacts of the first and second relays 42, 44 are normally connected to the first pairs of the stationary contacts. When the digital telephone set TL answers a call, this fact is detected by the conversion circuit 4, the output of the conversion circuit 4 to the AND circuit 48 is set to logical "0" to cause the AND circuit 48 to output a signal of logical "0" and the movable contacts of the relays 42, 44 are switched to the second pairs of the stationary contacts. In this case, when the switch SW-2 is closed to transfer communication to the cordless telephone set CT from the digital telephone set TL, the control circuit 8 transmits control data to the conversion circuit 4, causing the circuit 4 to output a signal of logical "1" to the AND circuit 48, whereby, the output of the AND circuit 48 is set to a logical "1" state to switch the movable contacts of the relays 42, 44 to the first pairs of the stationary contacts.

The constitution of the subunit Y shown in FIG. 1 is well known and comprises an antenna 20 for transmitting and receiving control data and audio data to or from the main unit X; a receiver 22 for receiving and demodulating a signal from the antenna 20 and separately extracting encoded control data and audio data; a codec 24 for decoding the audio data from the receiver 22 to reproduce a reception signal from a loud speaker 26 and for encoding a transmission signal applied to a microphone 28 to transfer this encoded signal to a transmitter 30; the transmitter 30 for modulating the encoded transmission signal and transmitting this signal from the antenna 20; and a control circuit 32 for controlling operations of the receiver 22 and the transmitter 30, for controlling the termination and origination of call in response to the reception of control data from the receiver 22, for causing received display data to be displayed on a display device 34, for supplying control data inputted from a keypad 36 to the transmitter 30 and for causing the control data on the display device 34.

In the case where data is sent to the digital PBX from the cordless telephone set CT, control data and audio data to be transmitted from the subunit Y are first encoded by the codes 24, modulated by the transmitter 30 and then transmitted as a radio signal from the antenna 20. The transmitted radio signal is received by the antenna 12 of the main unit X and is then supplied to the receiver 14. In the receiver 14, the received data is decoded to separately extract control data and audio data. The extracted control data is given through the control circuit 8 to the protocol conversion circuit 4 as the inherent control data. The audio data from the receiver 14 is sent to the data transmitting/receiving circuit 2. The protocol conversion circuit 4 converts the inherent control data given from the control circuit 8 into the control data specified by the protocol of the digital PBX by means of using the look-up table stored in the ROM 6. Then, the data transmitting/receiving circuit 2 sends the control data from the protocol conversion circuit 4 and the audio data from the receiver 14 to the PBX line.

Therefore, the cordless telephone set CT can be connected to any one of digital PBXs in different protocols by preparing, for each of the digital PBXs of different protocols, a protocol conversion circuit 4 comprising a ROM 6 storing a look-up table between the control data specified by the protocol of the digital PBX to which the cordless telephone set CT is to be connected and the inherent control data of the cordless telephone set CT and a data transmitting/receiving circuit 2 constituted corresponding to the number of digital PBX lines to transmit or receive control data and audio data, and by providing the main unit X with the protocol conversion circuit 4 and the data transmitting/receiving circuit 2 in correspondence with the digital PBX which the cordless telephone set CT is to be connected.

In the cordless telephone set explained with reference to FIG. 1, both or any one of the control circuit 8 of the main unit X and the control circuit 32 of the subunit Y are realized by means of microcomputers and therefore it is possible to add various functions to the cordless telephone set thereby realizing a multi-functional and easy-to-use cordless telephone set by programming these microcomputers as required.

SUMMARY OF THE INVENTION

It is therefore a first object of the present invention to provide a cordless telephone set which has a transplantation function to transplant functions of a digital telephone set.

It is a second object of the present invention to provide a cordless telephone set able to provide private communication by preventing a digital telephone set from eavesdropping on communication made through a subunit.

It is a third object of the present invention to provide a cordless telephone set which can repeatedly display data on a subunit even if the subunit does not answer a call.

It is a fourth object of the present invention to provide a cordless telephone set which can compress and display data from a digital telephone set.

The first to fourth objects of the present invention will be achieved by the invention defined by the appended claims.

According to one embodiment of the present invention, there is provided a cordless telephone set connected to digital switching equipment through a telephone line, comprising:

a transplantation command generating means for generating a TRANSPLANTATION ON command for instructing start of transplantation of at least one function of a digital telephone set to said cordless telephone set and a TRANSPLANTATION OFF command for instruct the end of said transplantation;

a transplantation mode setting/resetting means for setting said cordless telephone set to a transplantation mode in response to said TRANSPLANTATION ON command and for resetting said transplantation mode in response to said TRANSPLANTATION OFF command;

a key code generating means for generating a key code during a period wherein said cordless telephone set is in the transplantation mode, said key code representing a function key of said cordless telephone set corresponding to the function to be transplanted to said cordless telephone set from said digital telephone set;

a correspondence table storing means responsive to function codes representing the functions to be transplanted to said cordless telephone set from said digital telephone set and key codes generated by said key code generating means and corresponding to said functions to be transplanted, for storing a correspondence table between the function codes and the key codes; and a function code transmitting means responsive to a key code generated from said key code generating means when said cordless telephone set is not in the transplantation mode, for generating the function code corresponding to the generated key code by means of said correspondence table so as to transmit the function code to the telephone line.

The key code generating means may comprise an up/down key for causing a displaying means to sequentially display which one of said function keys corresponds to the function to be transplanted from said digital telephone set in response to the TRANSPLANTATION ON command and for generating a key code of the displayed function key.

According to another embodiment of the present invention, there is provided a cordless telephone set connected to digital switching equipment through a telephone line, comprising:

a called-state indicating means for indicating the receipt of a call when said cordless telephone set is called from said digital switching equipment;

a secrecy command generating means for generating and transmitting a SECRECY command when said cordless telephone set answers a call from said digital switching equipment;

an earlier answer detecting means for detecting which of a SECRECY command and an off-hook signal from said digital telephone set is generated earlier in response to the call; and a separating means for separating said digital telephone set from said cordless telephone set when said earlier answer detecting means detects that the SECRECY command has been generated earlier.

According to a further embodiment of the present invention, there is provided a cordless telephone set connected to digital switching equipment through a telephone line and having a main unit and a subunit, comprising:

a storing means responsive to display data from said digital switching equipment and for storing said display data therein;

a display means for displaying the content stored in said storing means;

a connection monitoring means for monitoring whether said main unit and said subunit are interconnected or not;

a specific operation monitoring means for monitoring whether a specific operation is performed or not;

a first display control means for causing the content of said storing means to be transferred to said display means when said connection monitoring means determines that said main unit is connected to said subunit so as to display such stored content on said display means for a predetermined period and for clearing said display means when the predetermined period has passed or when said specific operation monitoring means determines that said specific operation has been performed within the predetermined period; and a second display control means for causing the content of said storing means to be transferred to said display means so as to display such content on said display means when said specific operation monitoring means determines that said specific operation has been performed after the predetermined period has passed.

The cordless telephone set may further comprise a connection retrial means for intermittently attempting to interconnect said main unit and said subunit for a predetermined number of times when said connection monitoring means determines that said main unit and said subunit are not interconnected.

According to still another embodiment of the present invention, there is provided a cordless telephone set connected to digital switching equipment through a telephone line, comprising:

a temporary storing means for temporarily storing display data received from said digital switching equipment;

a processing means for compressing the display data stored in said temporary storing means to generate compressed display data; and a data display means responsive to the compressed display data from said processing means for displaying the compressed data thereon.

The processing means further comprises:

a continuous space character detecting means for detecting continuous space characters included in the display data stored in said temporary storing means;

a compressing means for compressing the display data by replacing two or more continuous space characters with one space character when said continuous space detecting means detects two or more continuous space characters so as to cause the compressed display data to be stored in said temporary storing means; and a transmitting means for transmitting the compressed display data to said data display means.

Other features and advantages of the invention will become apparent from the following description taken in connection with the accompanying drawings.

DESCRIPTION OF THE PREFERRED EMBODIMENTS

Figure 1:
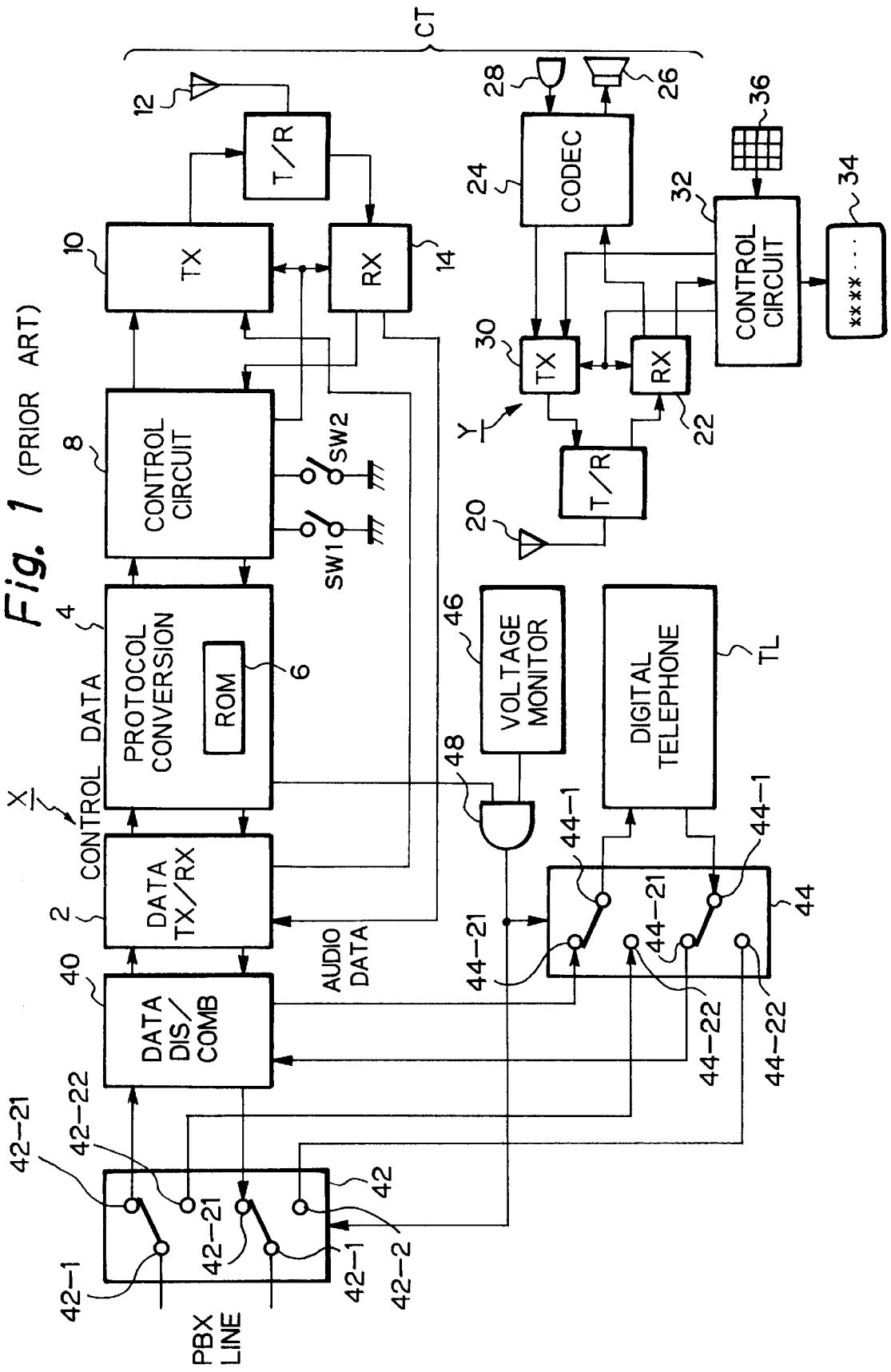
FIG. 1 is a block diagram schematically illustrating the constitution of a cordless telephone set disclosed in a patent application filed earlier.

Some preferred embodiments of a cordless telephone set according to the present invention will be explained with reference to the accompanying drawings. FIG. 2 illustrates a basic constitution of a cordless telephone set according to the present invention. A control circuit 8 of the main unit X and the control circuit 32 of a subunit Y are preprogrammed to realize (1) a transplantation function for transplanting desired functions of the digital telephone set TL to the cordless telephone set, (2) a secrecy function for preventing the digital telephone set TL from eavesdropping on communication made through the cordless telephone set CT, (3) a repeated display function for repeatedly displaying data received from a PBX line on a subunit Y in accordance with instructions, and (4) compression and display functions for effectively displaying data received from the PBX line on the subunit Y. The control circuit 8 includes a RAM 50 and a ROM 52 for storing data temporarily and the control circuit 32 includes a RAM 54 for storing data temporarily. Similar or identical constitutional elements are designated by the same reference numerals as those in FIG. 1 and such elements are not described repeatedly. Constitutions and operations for realizing the functions (1) to (4) will be explained in detail.

Transplantation Function

In order to enable particular functions, for example, holding, communication among three parties, transfer, redialing and line selection, etc. of a digital telephone set TL to be transplanted to the cordless telephone set CT, the control circuit 8 of the main unit X and the control circuit 32 of the subunit Y are preprogrammed to perform the following steps.

(1) When a user depresses one specific function key on the keypad 36 of the subunit Y or depresses a plurality of function keys simultaneously or sequentially, the control circuit 32 of the subunit Y determines that transplantation of functions of the digital telephone set TL is requested, generates a TRANSPLANTATION ON command and transmits the command to the main unit X through the transmitter 30 and the antenna 20.

(2) The main unit X receives the TRANSPLANTATION ON command through the antenna 12 and the receiver 14 and then sends the received TRANSPLANTATION ON command to the control circuit 8.

(3) The control circuit 8 determines that the TRANSPLANTATION ON command has been inputted and activates the first relay 42 and the second relay 44 through the protocol conversion circuit 4, the data transmitting receiving circuit 2 and the data distribution/combination circuit 40 to thereby locate the movable contacts 42-1 of the first relay 42 at the neutral position and connect the movable contacts 44-1 to the first pair of the stationary contacts 44-21.

(4) When the digital telephone set TL is connected to the main unit X, the control circuit 8 sends a command to the subunit Y to inform that the preparation for transplantation of function has been completed.

(5) Upon reception of this command, the subunit Y causes the display device 34 to display a message "TO BE REGISTERED TO FUNCTION KEY A1" indicating that, when a function of the digital telephone set TL is selected, the selected function is to be registered to the first function key A1 of the subunit Y, and sends a key code $\alpha 1$ representing the function key A1 to the control circuit 8 of the main unit X.

(6) A user, confirming that the above message is displayed on the display device 34 of the subunit Y, selects a first function to be transplanted to the cordless telephone set CT from the digital telephone set TL, depresses a function key B1 of the digital telephone set TL corresponding to the selected function and sends a function code $\beta 1$ inherent to the function key B1 to the control circuit 8 from the digital telephone set TL.

(7) Then, the control circuit 8 causes the ROM 50 to store the correspondence between the key code al and the function code $\beta 1$ on the basis of the reception of the key code $\alpha 1$ and the subsequent reception of the function code $\beta 1$.

(8) When the transplantation of the first function is completed, the control circuit 8 of the main unit X notifies the control circuit 32 of the subunit Y of the completion of the transplantation of the first function.

(9) In reply to the notification, the control circuit 32 causes the display device 32 to display a message "TO BE REGISTERED TO FUNCTION KEY A2" and sends a key code $\alpha 2$ representing the function key A2 to the main unit X.

(10) The user selects the second function to be transplanted to the cordless telephone set CT from the digital telephone set TL, depresses a function key B2 corresponding to such function and send the inherent function code $\beta 2$ of the function key B2 to the control circuit 8 from the digital telephone set TL. Then, the control circuit 8 causes the RAM 50 to store the correspondence between the key code $\alpha 2$ and the function code $\beta 2$.

(11) Hereinafter, similar steps are repeated in accordance with the number of functions to be transplanted to the cordless telephone set CT from the digital telephone set TL or the number of function keys of the cordless telephone set CT, thereby completing a correspondence table indicating the correspondence between the inherent key codes of the function keys of the subunit Y and the inherent function codes of the function keys of the digital telephone set TL, and the correspondence table is stored in RAM 50.

(12) When the key code correspondence table has been completed as explained above and a particular key, for example, a talk key of the subunit Y is depressed, the control circuit 32 generates a TRANSPLANTATION OFF command representing the completion of the function transplantation mode and sends this command to the main unit X. In response to the TRANSPLANTATION OFF command, the control circuit 8 resets the movable contacts 44-1 of the second relay 44 to the neutral position and transferred the key code correspondence table stored in the RAM 50 to the EEROM 52 for storing therein. Thus, desired functions of the digital telephone set TL have been completely transplanted to the cordless telephone set CT.

(13) After the key code correspondence table has been stored in the EEROM 52 by the steps (1) to (12) explained above, when a user depresses, for example, the function key A1 of the subunit Y in order to utilize the function transplanted from the digital telephone set TL, the inherent key code al of the function key A1 is transmitted to the main unit X from the subunit Y. Then, the control circuit 8 of the main unit X decodes this key code $\alpha 1$, connects the movable contacts 42-1 of the first relay 42 to the first pair of the stationary contacts 42-21, reads the key code $\beta 1$ corresponding to the key code $\alpha 1$ from the key code correspondence table stored in the EEROM 52 and sends the key code pl to the protocol conversion circuit 4. The protocol conversion circuit 4 converts the key code $\beta 1$ to the signal matched with the protocol of the digital switching equipment and sends this signal to the data switching equipment through the data transmitting/receiving circuit 2, the data distribution/combination circuit 40 and the first relay 42.

After the completion of the function transplantation, a function realized by depressing a function key of the digital telephone set TL can also be realized by the subunit Y by depressing a function key thereof.

Figure 2:
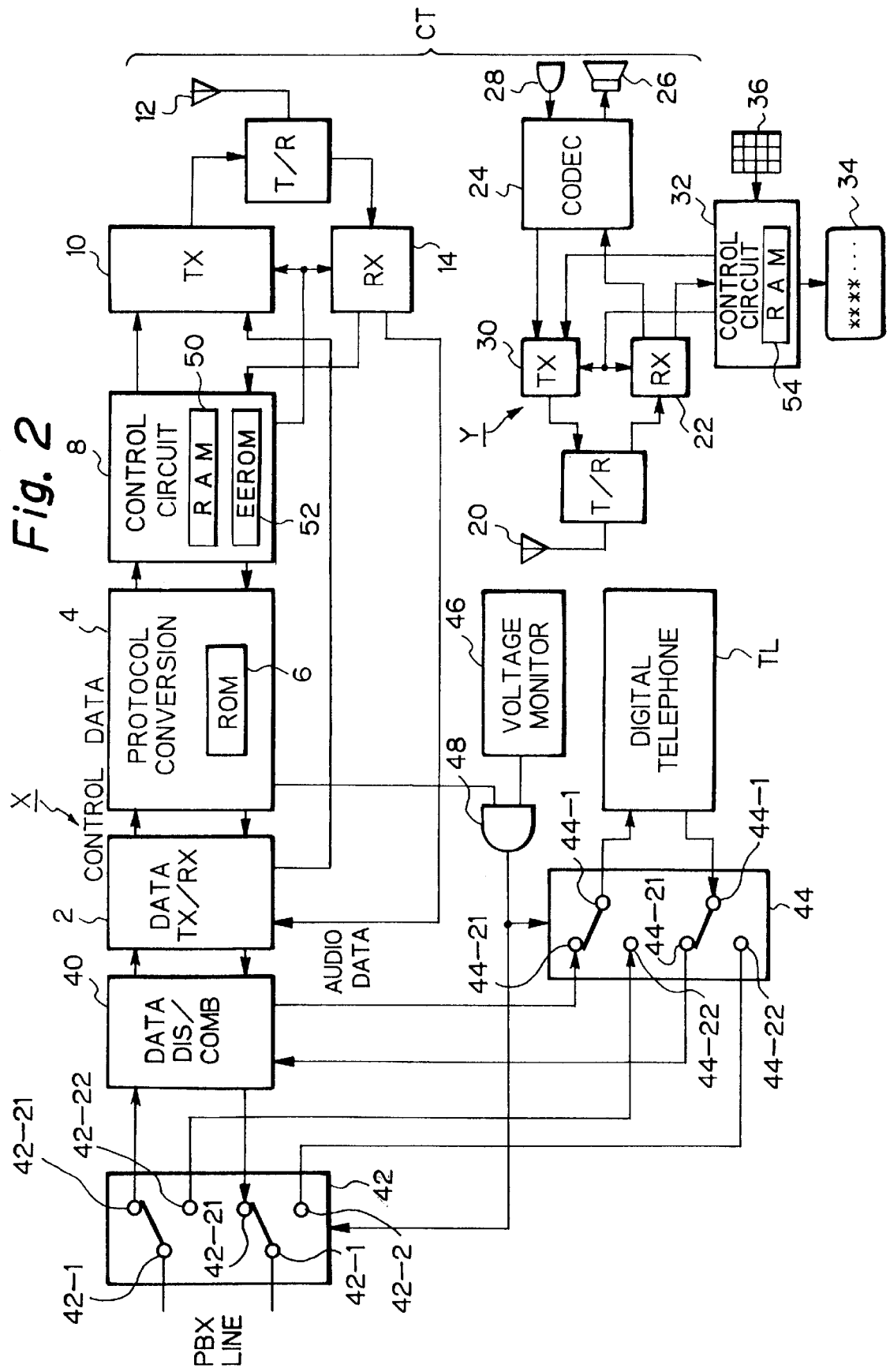
FIG. 2 is a block diagram schematically illustrating a basic constitutions of a main unit and a subunit of a cordless telephone set according to the present invention.
Figure 3:
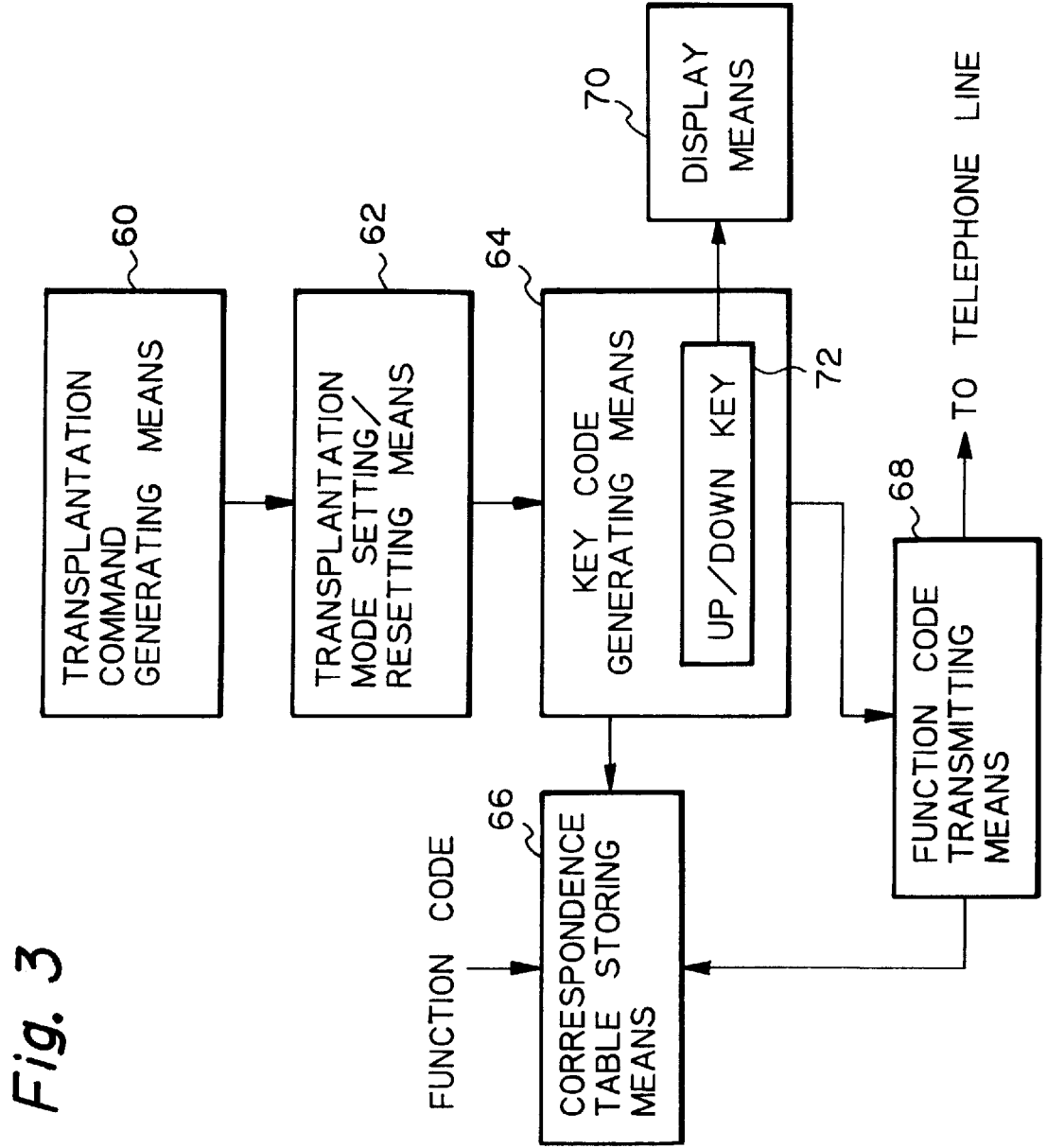
FIG. 3 is a diagram illustrating a preferred embodiment of the present invention as a combination of function achieving means for providing the cordless telephone set shown in FIG. 2 with a transplantation function.

From the above explanation, the cordless telephone set CT shown in FIG. 2 can be considered to comprise a combination of the following function realizing means as shown in FIG. 3;

a transplantation command generating means 60 for generating a TRANSPLANTATION ON command which instructs to start transplantation of functions of the digital telephone set to the cordless telephone set and a TRANSPLANTATION OFF command which instructs to end the transplantation;

a transplantation mode setting/resetting means 62 for setting the cordless telephone set to a transplantation mode in response to the TRANSPLANTATION ON command and resetting the transplantation mode in response to the TRANSPLANTATION OFF command;

a key code generating means 64 for generating a key code representing a function key of the cordless telephone set corresponding to the function to be transplanted to the cordless telephone set from the digital telephone set, during a period that the cordless telephone set is in the transplantation mode;

a correspondence table storing means 66, responsive to function codes representing the functions to be transplanted to the cordless telephone set from the digital telephone set and key codes generated by the key code generating means 64 and corresponding to the functions to be transplanted, for storing a correspondence table between the function codes and the key codes; and a function code transmitting means 68, responsive to a key codes generated by the key code generating means 64 when the cordless telephone set is not in the function transplantation mode, for generating a function code corresponding to the generated key code based on the correspondence table and for transmitting the generated function code to the telephone line.

The key code generating means 64 may further comprises an up/down key 72 for causing a displaying means 70 to sequentially display function keys which correspond to the functions transplanted from the digital telephone set in response to the TRANSPLANTATION ON command and for generating a key code of each displayed function key.

Secrecy Function

In the cordless telephone set CT shown in FIG. 2, the digital telephone set TL can be prevented from eavesdropping on communication being conducted through the cordless telephone set CT. This can be realized by preprogramming the control circuits 8 and 32 to perform the following steps. It is assumed that both the cordless telephone set CT shown in FIG. 2 and the digital telephone set TL are in a normal call waiting mode, that the movable contacts 42-1 of the first relay 42 are connected to the first pair of stationary contacts 42-21 and that the movable contacts 44-1 of the second relay 44 are connected to the first pair of stationary contacts 44-21.

(1) When the cordless telephone set CT receives a call signal from the digital switching equipment, the control circuit 8 of the main unit X of the cordless telephone set CT generates a CALL command representing the arrival of the call signal and sends the CALL command to the subunit Y by way of the transmitter 10 and the antenna 12. The digital telephone set TL also detects the arrival of the call signal and generates a call tone.

(2) In response to the call signal from the digital switching equipment, the control circuit 8 starts to watch which of the subunit Y and the digital telephone set TL will answer first.

(3) The subunit Y indicates the arrival of call signal, such as generates a call tone, upon receiving the CALL command from the main unit X.

(4) If the subunit Y answers the call signal prior to the digital telephone set TL by depressing the talk button, the control circuit 32 generates a TALK BUTTON PRESS command and sends this command to the main unit X through the transmitter 30 and the antenna 20.

(5) The control circuit 8, receiving the TALK BUTTON PRESS command from the subunit Y, not an OFF HOOK command representing an answer made by the digital telephone set TL, determines that the subunit Y has answered the call signal prior to the digital telephone set TL.

(6) The control circuit 8 sends a CONTROL command to the second relay 44 and sets the movable contacts 44-1 to the neutral position. In this way, the digital telephone set TL can be prevented from eavesdropping communication made by the cordless telephone set CT.

Figure 4:
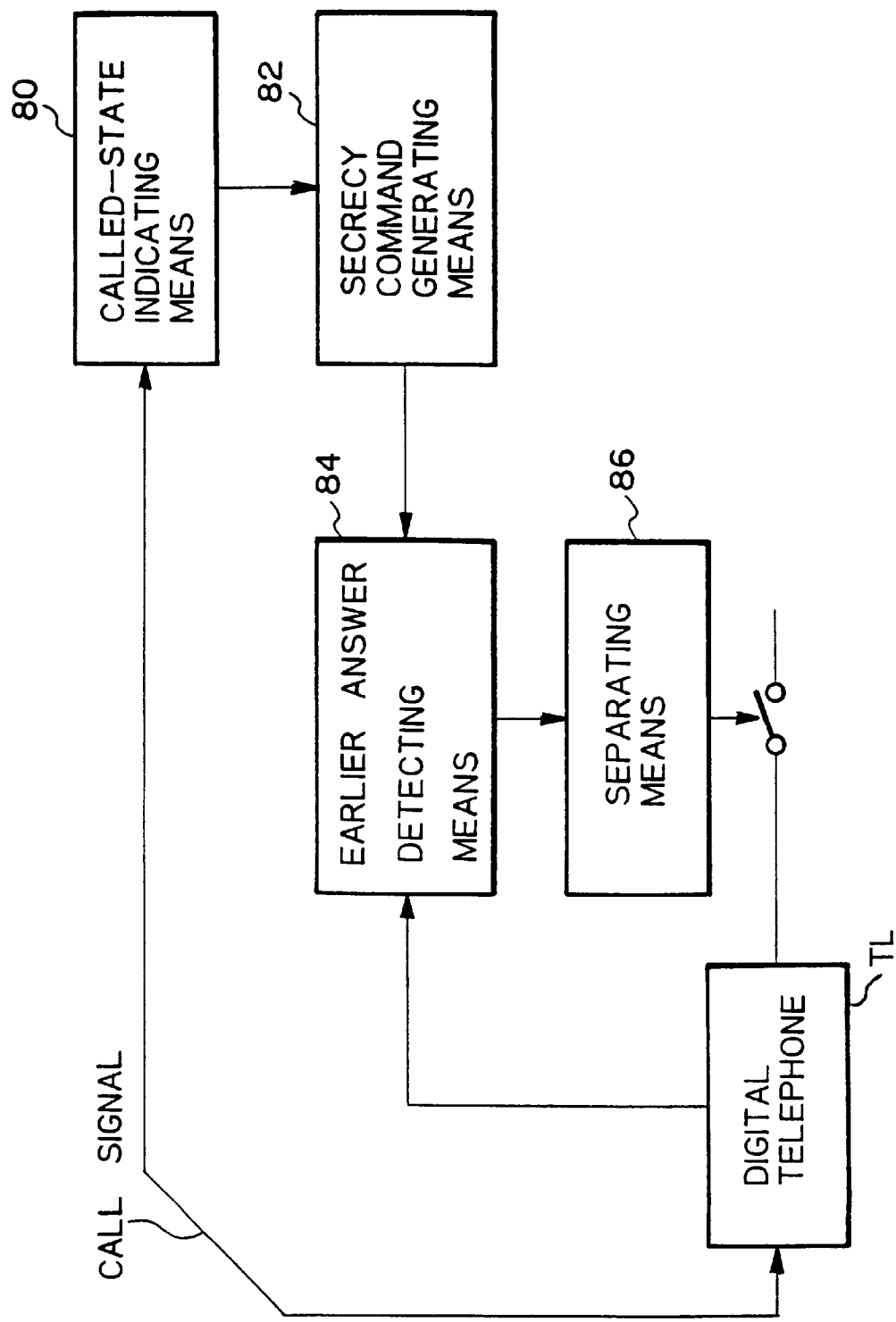
FIG. 4 is a diagram illustrating another preferred embodiment of the present invention as a combination of function achieving means for providing the cordless telephone set shown in FIG. 2 with a secrecy function.

In other words, the cordless telephone set shown in FIG. 2 can be considered to comprise a combination of the following function realizing means as shown in FIG. 4:

a called-state indicating means 80 for indicating the receipt of a call when the cordless telephone set CT is called from the digital switching equipments;

a SECRECY command generating means 82 for generating and transmitting a SECRECY command when an answer is made to the call;

an earlier answer detecting means 84 for detecting which of a SECRECY command and an off-hook signal from the digital telephone set TL is generated earlier in response to the call; and a separating means 86 for separating the digital telephone set TL from the cordless telephone set CT when the earlier answer detecting means 84 detects that the SECRECY command has been generated earlier.

Repeated Display Function

The cordless telephone set CT shown in FIG. 2 can be provided with a function to repeatedly display, on the subunit Y, data sent from the digital switching equipment (for example, a telephone number of a caller and a message indicating that there is a voice mail, etc.). In order to realize this function, the control circuit 8 and the control circuit 32 are preprogrammed to perform the following steps.

(1) When display data arrives at the cordless telephone set CT from the digital switching equipment, the control circuit 8 of the main unit X causes the RAM 50 to temporarily store the received display data in a predetermined storage region and monitors whether the main unit X has been connected with the subunit Y or not.

(2) When the main unit X and the subunit Y are interconnected, the control circuit 8 of the main unit X transfers the display data stored in the RAM 50 to the subunit Y.

(3) When the subunit Y receives the display data transferred from the main unit X, the control circuit 32 of the subunit Y causes the RAM 4 to store the transferred display data in a predetermined storage region, causes the display device 34 to display the content of the display data for a predetermined period and monitors whether or not the subunit Y has performed, within the predetermined period, a specific operation (for example, an operation of answering the call, taking up the subunit Y from a charging cradle of the cordless telephone set CT or depressing a predetermined key, etc.).

(4) when the specific operation is performed by the subunit Y within the predetermined period, this fact is informed to the control circuit 8 of the main unit X from the subunit Y and the control circuit 8 notifies the digital switching equipment that the specific operation has been completed in the subunit Y. Then, the digital switching equipment sends, at an adequate point of time (for example, when telephonic communication is started or completed in a case where the display data is a telephone number of the caller), a DISPLAY CLEAR command for erasing the display data to the main unit X and then to the subunit Y through the main unit X. In response to the DISPLAY CLEAR command, the control circuits 8, 32 of the main unit X and subunit Y erase the display data on the display device 34 by overwriting respectively the RAM 40 and the RAM 54 with the DISPLAY CLEAR command.

(5) If the specific operation described above is not yet completed when the predetermined period has passed from the time of transmission of the display data, the display device 34 is cleared in a sequence similar to that of the step (4). Thereafter, if the specific operation is performed in the subunit Y, this fact is notified to the digital switching equipment from the subunit Y through the main unit X. then, the digital switching equipment sends the display data to the cordless telephone set CT and thus to the subunit Y by way of the main unit X to thereby display the data on the display device 34 again.

(6) When display data arrives at the cordless telephone set CT from the digital switching equipment in the step (1), if the control circuit 8 determines that the main unit X and subunit Y are not interconnected for such a reason that a battery has been removed from the subunit Y or that the subunit Y is located outside a region where a signal from the main unit X reaches the subset Y, this fact is stored in the control circuit 8 of the main unit X and the control circuits 8 attempts to interconnect the main unit X and the subunit Y for a predetermined number of times at a constant interval of time. When the main unit X is connected with the subunit Y, the operations described in the items (2) to (5) are performed.

Figure 5:
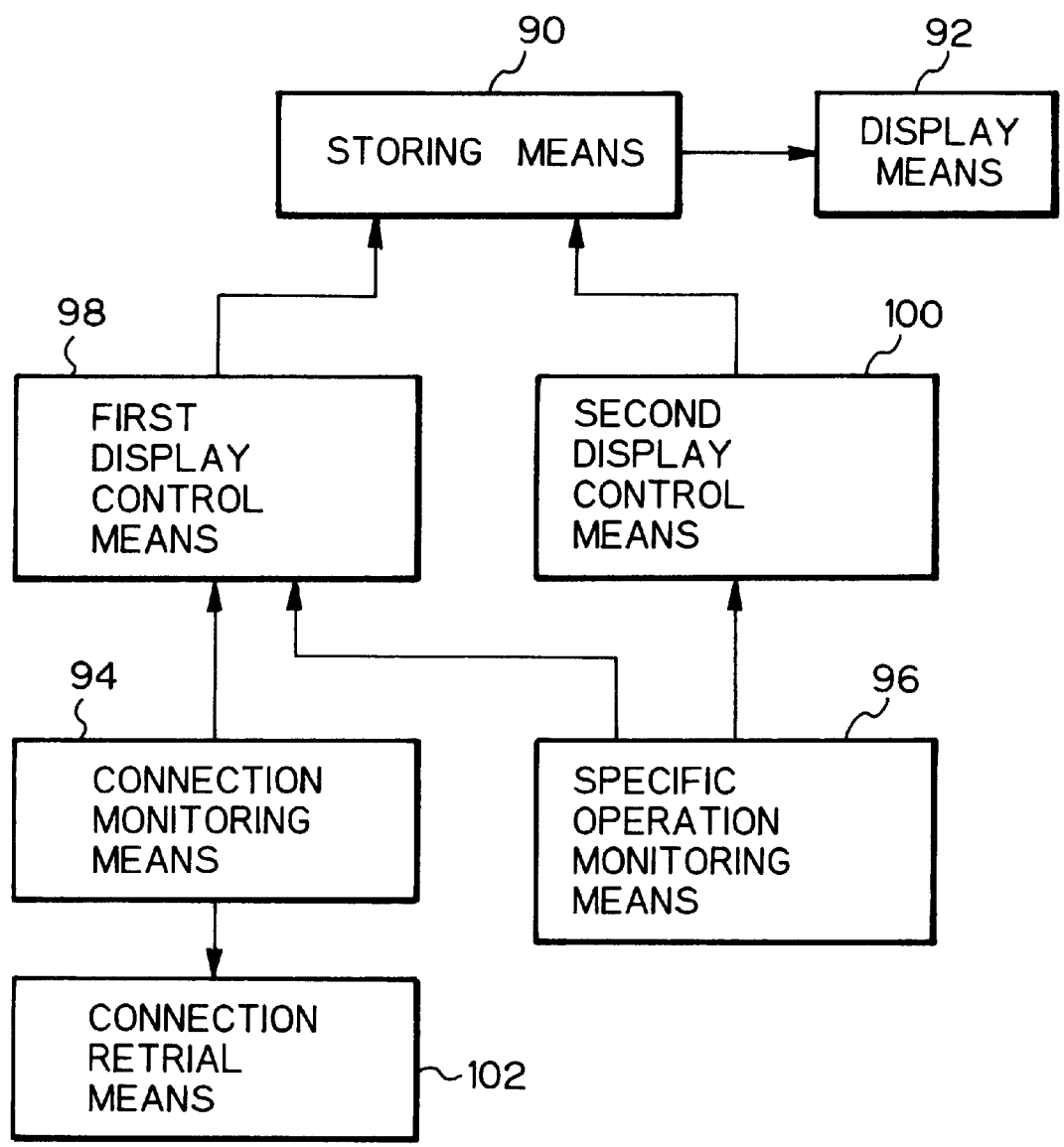
FIG. 5 is a diagram illustrating further preferred embodiment of the present invention as a combination of function achieving means for providing the cordless telephone set shown in FIG. 2 with a repeated display function.

In other words, the cordless telephone set shown in FIG. 2 can be considered to comprise a combination of the following function realizing means as shown in FIG. 5;

a storing means 90 responsive to display data from a digital switching equipment for storing the display data;

a display means 92 for displaying the content stored in the storing means 90;

a connection monitoring means 94 for monitoring whether or not the main unit X and the subunit Y are interconnected;

a specific operation monitoring means 96 for monitoring whether a specific operation is performed or not;

a first display control means 98 for causing the content of the storing means 90 to be transferred to the displaying means 92 when the connection monitoring means 94 determines that the main unit X is connected with the subunit Y so as to display such stored content on the display means 92 for a predetermined period and for clearing the display means 92 when the predetermined time has passed or when the specific operation monitoring means 96 determines that the specific operation has been performed within the predetermined period; and a second display control means 100 for causing the content of the storing means 90 to be transferred to the display means 92 so as to display such content on the display means 92 when the specific operation monitoring means 96 determines that the specific operation has been performed after the predetermined period has passed.

This cordless telephone set 96 can further comprise a connection retrial means 102 for intermittently attempting to interconnect the main unit X and the subunit Y for a predetermined number of times when the connection monitoring means determines that the main unit X and the subunit Y are not interconnected.

Compressed Display Function

Display data (for example, the name or telephone number of a caller) transmitted to the cordless telephone set CT from the digital switching equipment has a length, for example, of 40 characters. Since the subunit Y is small in size, it is impossible to provide the subunit Y with a display device which can display data which is as long as 40 characters. The display device 34 of the subunit Y can actually display only 24 characters in maximum (12 characters per line are displayed in two lines in parallel). However, display data transmitted from the digital switching equipment often includes continuous space characters (namely, a region including no character) and some information to be transmitted to a user has as short a length as only a half of 40 characters. Therefore, in order to display, as long a message as possible on the display device 34, said message included in display data transmitted to the cordless telephone set CT from the digital switching equipment, the control circuits 8 and 32 are preprogrammed to perform the following steps.

(1) When the main unit X receives the display data from the digital switching equipment, the control circuit 8 causes the RAM 50 to temporarily store the received display data in a display data storing region.

(2) The control circuit 8 sequentially reads character by character the display data stored in the display data storing region and counts the number of continuous space characters. If the control circuit 8 counts two or more continuous space characters, those characters are compressed to one space character. The compressed display data as explained above is stored in a predetermined storing region of the RAM 50 and then transmitted to the subunit Y.

(3) The control circuit 32 of the subunit Y detects that the compressed display data has been received from the main unit X and displays this compressed data on the display device 34.

Figure 6:
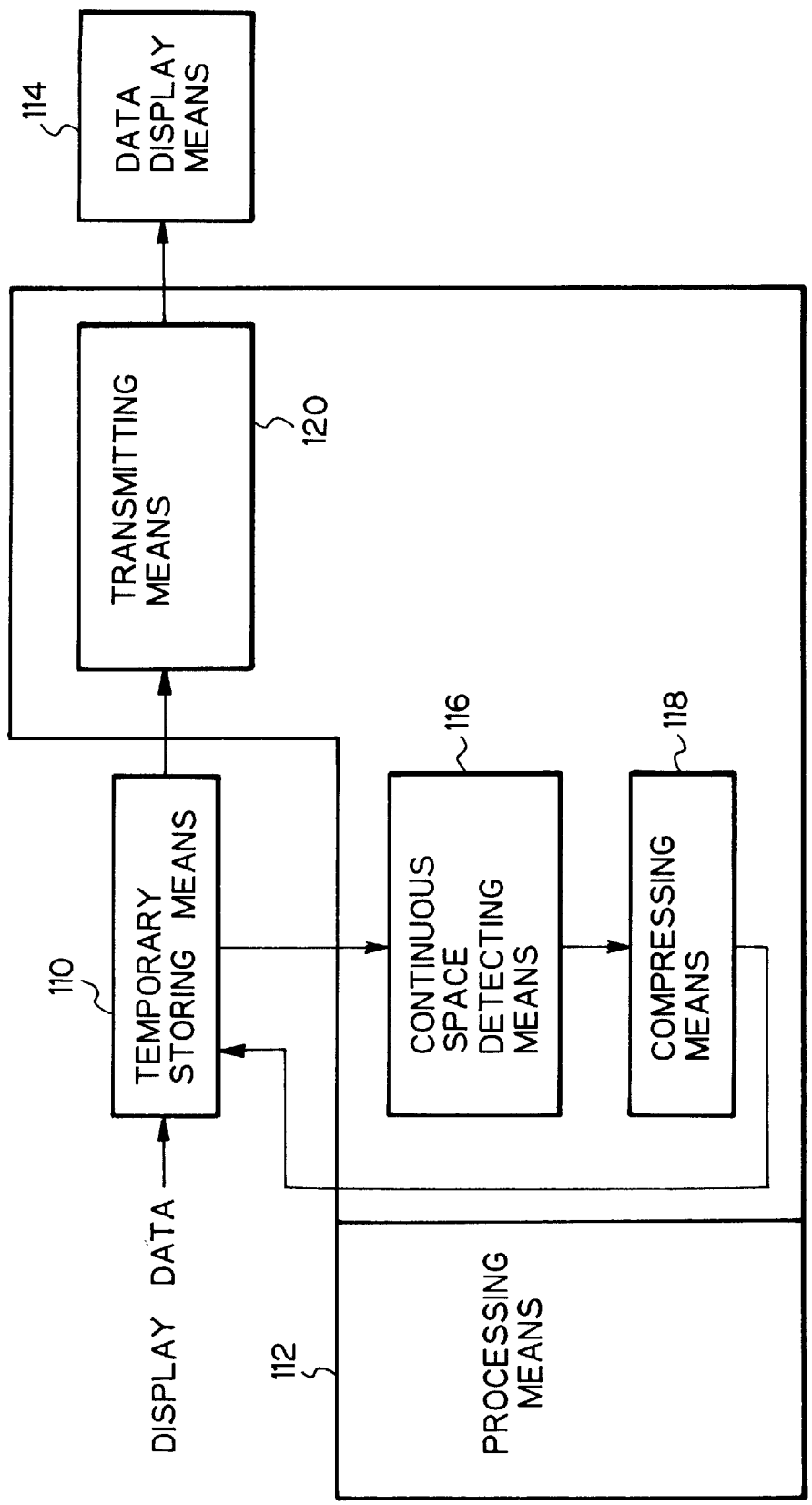
FIG. 6 is a diagram illustrating still another preferred embodiment of the present invention as a combination of function achieving means for providing the cordless telephone set shown in FIG. 2 with compression and display functions.

In other words, the cordless telephone set shown in FIG. 1 can be considered to comprise a combination of the following function realizing means as shown in FIG. 6:

a temporary storing means 110 for temporarily storing display data received from the digital switching equipment;

a processing means 112 for compressing the display data stored in the temporary storing means 110 to generate compressed display data; and a data display means 114 responsive to the compressed display data from the processing means 112 for displaying such data.

The processing means 112 comprises:

a continuous space character detecting means 116 for detecting continuous space characters included in the display data stored in the temporary storing means 110;

a compressing means 118 for compressing the display data by replacing two or more continuous space characters with one space character when two or more continuous space characters are detected by the continuous space character detecting means 116 so as to cause the compressed display data to be stored in the temporary storing means; and a transmitting means 120 for transmitting the compressed display data to the data display means 114.

As can be understood from the above description, the present invention can provide an easy-to-use cordless telephone set which possesses various functions, such as a function for transplanting the functions of a digital telephone set, a secrecy function for preventing the digital telephone set from eavesdropping, a repeated display function for displaying display data repeatedly and a compressed display function for compressing display data, by adequately preprogramming the control circuits of the main unit and the subunit.

The invention has been described in detail with particular reference to certain preferred embodiments thereof, but it will be understood that variations and modifications can be effected within the spirit and scope of the invention.

What is claimed is:

1. A cordless telephone set connected to digital switching equipment by way of a telephone line, comprising:

a transplantation command generator for generating a TRANSPLANTATION ON command for instructing to start transplantation of at least one function of a digital telephone set to said cordless telephone set and a TRANSPLANTATION OFF command for instructing to end said transplantation;

a transplantation mode setting/resetting circuit for setting said cordless telephone set to a transplantation mode in response to said TRANSPLANTATION ON command and for resetting said transplantation mode in response to said TRANSPLANTATION OFF command;

a key code generator for generating a key code during a period wherein said cordless telephone set is in the transplantation mode, said key code representing a function key of said cordless telephone set corresponding to the function to be transplanted to said cordless telephone set from said digital telephone set;

a correspondence table storing memory, responsive to function codes representing the functions to be transplanted to said cordless telephone set from said digital telephone set and key codes generated by said key code generator and corresponding to said functions to be transplanted, for storing a correspondence table -between the function codes and the key codes; and a function code transmitter, responsive to a key code generated from said key code generator when said cordless telephone set is not in the transplantation mode, for generating the transplanted function code corresponding to the generated key code by means of said correspondence table so as to transmit the transplanted function code to the telephone line without access to the digital telephone set.

2. A cordless telephone set according to claim 1, wherein said key code generating means comprises an up/down key for causing a display means to sequentially display which one of said function keys corresponds to the function to be transplanted from said digital telephone set in response to the TRANSPLANTATION ON command and for generating a key code of the displayed function key.

3. The cordless telephone set of claim 1, further comprising:

a called-state indicating means for indicating the receipt of a call when said cordless telephone set is called from said digital switching equipment;

a secrecy command generating means for generating and transmitting a SECRECY command when said cordless telephone set answers to the call from said digital switching equipment;

an earlier answer detecting means for detecting which of a SECRECY command and an off-hook signal from said digital telephone set is generated earlier in response to the call; and a separating means for separating said digital telephone set from said cordless telephone set when said earlier answer detecting means detects that the SECRECY command has been generated earlier.

4. The cordless telephone set of claim 1, having a main unit and a subunit and further comprising:

a storing means responsive to display data from said digital switching equipment and for storing said display data therein;

a display means for displaying the content stored in said storing means;

a connection monitoring means for monitoring whether said main unit and said subunit are interconnected or not;

a specific operation monitoring means for monitoring whether a specific operation is performed or not;

a first display control means for causing the content of said storing means to be transferred to said display means when said connection monitoring means determines that said main unit is connected to said subunit so as to display such stored content on said display means for a predetermined period and for clearing said display means when the predetermined period has passed or when said specific operation has been performed within the predetermined period; and a second display control means for causing the content of said storing means to be transferred to said display means so as to display such content on said display means when said specific operation monitoring means determines that said specific operation has been performed after the predetermined period has passed.

5. A cordless telephone set according to claim 4, further comprising a connection retrial means for intermittently attempting to interconnect said main unit and said subunit for a predetermined number of times when said connection monitoring means determines that said main unit and said subunit are not interconnected.

6. A cordless telephone set connected to digital switching equipment through a telephone line, comprising:

a temporary storing buffer for temporarily storing display data received from said digital switching equipment;

a repeated space character detector for detecting repeated space characters included in the display data stored in said temporary storing buffer;

a compressor for compressing the display data by replacing two or more repeated space characters with one space character when said repeated space detector detects two or more repeated space characters so as to reduce a length of the display data and cause the compressed display data to be stored in said temporary storing buffer; and a transmitter for transmitting the compressed display data to a data display, wherein the data display is responsive to the compressed display data from said transmitter for displaying the compressed data thereon.

* * * * *